United States Patent [19]
Yen

[11] 3,725,765
[45] Apr. 3, 1973

[54] SWITCH-TYPE D.C. TO D.C. CONVERTER

[75] Inventor: Chu-Sun Yen, Palo Alto, Calif.

[73] Assignee: Hewlett-Packard Company, Palo Alto, Calif.

[22] Filed: Nov. 22, 1971

[21] Appl. No.: 200,763

[52] U.S. Cl. .................................................. 321/2
[51] Int. Cl. ............................................. H02m 3/22
[58] Field of Search ............... 321/2; 331/111, 112

[56] References Cited

UNITED STATES PATENTS

| | | |
|---|---|---|
| 2,895,081 | 7/1959 | Crownover et al. ............. 331/112 |
| 3,243,711 | 3/1966 | King et al. ....................... 331/112 |
| 3,381,202 | 4/1968 | Loucks et al. ...................... 321/2 |
| 2,854,615 | 9/1958 | Light .................................. 321/2 |
| 3,273,050 | 9/1966 | Pratt ................................... 321/2 |
| 3,274,478 | 9/1966 | Hollmann et al. .............. 321/2 X |

Primary Examiner—William M. Shoop, Jr.
Attorney—Roland I. Griffin

[57] ABSTRACT

A transistor coupled to a nonsaturating transformer is provided with a capacitive feedback path to form a D.C. to D.C. converter.

5 Claims, 3 Drawing Figures

SWITCH-TYPE D.C. TO D.C. CONVERTER

BACKGROUND OF THE INVENTION

This invention relates to a switch-type D.C. to D.C. converter using transistor storage time to initiate switching and to improve efficiency. According to the prior art, many transistorized switch-type converters required continuous base drive current during transistor conduction periods. Charge stored during transistor conduction periods had to be removed by a large reverse current before the transistor could be switched to cutoff. These drive current requirements reduced over-all circuit efficiency. Switch-type converters also exist which rely on saturated-core transformers to initiate switching action. The losses accrued in the transformer lower the circuit efficiency.

SUMMARY OF THE INVENTION

According to the present invention a transistor having a long storage time connects to a nonsaturating transformer. Feedback from the transformer to the transistor is through a capacitor. Biasing insures initial transistor conduction and conduction is maintained by inherent transistor storage time. Transistor cutoff occurs after its storage time lapses. External drive may be used to control the transistor switching. Increased efficiency is realized with this circuit since neither a saturated-core transformer nor a continuous supply of bias current is necessary.

DESCRIPTION OF THE PREFERRED EMBODIMENT

Figure 1:
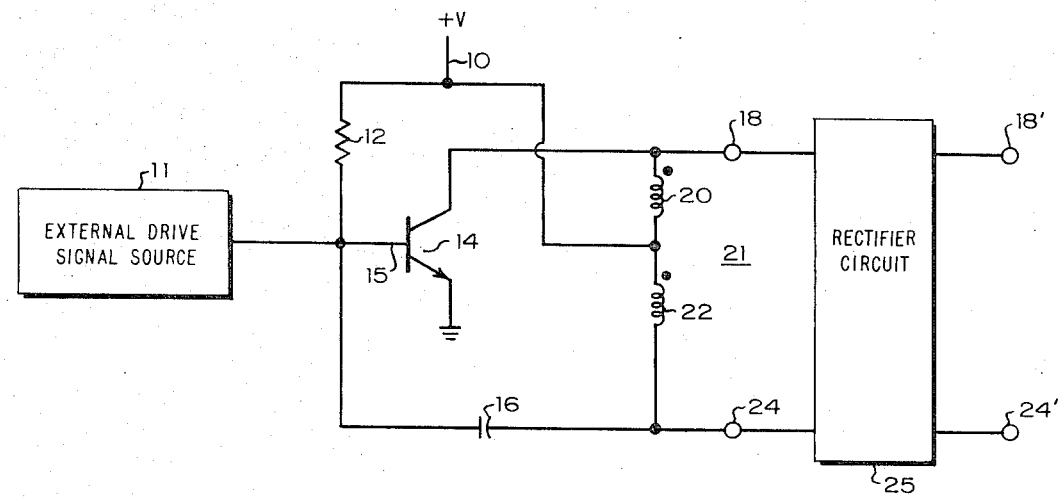
FIG. 1 is a simplified schematic representation of a switch-type converter according to a preferred embodiment of the present invention.

Referring to FIG. 1, there is shown a switch-type D.C. to D.C. converter, which receives D.C. power from a voltage source 10, and produces a pulsating output voltage across terminals 18 and 24. A transformer 21 comprised of windings 20 and 22 connects across terminals 18 and 24. These terminals are connected to a rectifier circuit 25 which converts the A.C. voltage on terminals 18 and 24 to a D.C. voltage on terminals 18' and 24'. Assume that initially transistor 14 is cutoff and that terminal 18 is more positive in potential than terminal 24. Resistor 12, connected between the power source 10 and the base 15 of transistor 14, applies a forward bias to transistor 14 and limits base current. The current supplied through resistor 12 is insufficient by itself to cause the transistor to saturate. When forward biased, transistor 14 conducts and transformer 21 inverts the signal on the collector of transistor 14 so that terminal 18 decreases in potential while terminal 24 increases. A capacitor 16 couples the potential increase on terminal 24 to base 15, causing the transistor to go into saturation. The duration of the potential increase, or pulse, applied through capacitor 16 depends on an RC time constant determined principally by the values of capacitor 16 and resistor 12. The time period in which transistor 14 remains in saturation depends primarily on its inherent charge storage time ($t_s$). Selection of a transistor with a long $t_s$ compared to the pulse duration increases the circuit efficiency.

After $t_s$ has elapsed, conduction through transistor 14 decreases, and transformer 21 again inverts the signal on the collector of transistor 14 so that terminal 18 increases in potential while terminal 24 decreases. The decreasing potential at terminal 24 couples through capacitor 16 to speed the decrease in conduction or cutoff of transistor 14. Thus, the transistor cutoff is self-initiated and does not rely on devices external to the transistor such as saturated-core transformers. Transistor 14 remains cutoff for a time period determined by load conditions and the RC network comprised primarily of resistor 12 and capacitor 16. This switching action is repetitive, with transistor 14, alternately conducting and being cut off. It should be noted that during each cycle, neither transformer winding 20 nor 22 causes saturation in their mutual core.

Efficiency of the D.C. to D.C. converter is principally determined by the transistor and transformer characteristics and by pulse duration. The transistor should be selected to have a relatively low collector-to-emitter voltage at saturation ($C_{CE(SAT)}$) and a relatively long $t_s$. Losses in the transformer can be minimized by selecting the transformer core area and material for a minimal flux density. Resistor 12 and capacitor 16 are selected to make the duration of the pulse applied to the base of transistor 14 short compared with $t_s$, which helps to increase the converter efficiency. Although the peak current of the pulse applied to the base is greater than the steady-state current that would be required to keep the transistor turned on, the average current supplied by the pulses is much lower than that steady-state current.

Pulses from an external drive signal source 11 (see FIG. 1) may be used to control the conduction cycle of transistor 14. Consider the converter operating as described previously. The application of a positive pulse by external drive signal source 11 to base 15 while transistor 14 is in saturation will reinitiate $t_s$. A continuous train of positive pulses from external drive signal source 11 will cause transistor 14 to conduct continuously, if the pulse spacing is less than $t_s$. Such continuous conduction will supply greater current to a load connected across terminals 18 and 24. The duration of positive pulses from external drive signal source 11 should be short, i.e., the pulse duty cycle should be relatively low. For greatest efficiency, positive pulses from external drive signal source 11 should arrive just prior to the normal completion of transistor 14 conduction. Interruption of the positive pulses from external drive signal source 11 will cause the converter to resume normal operation.

Figure 2:
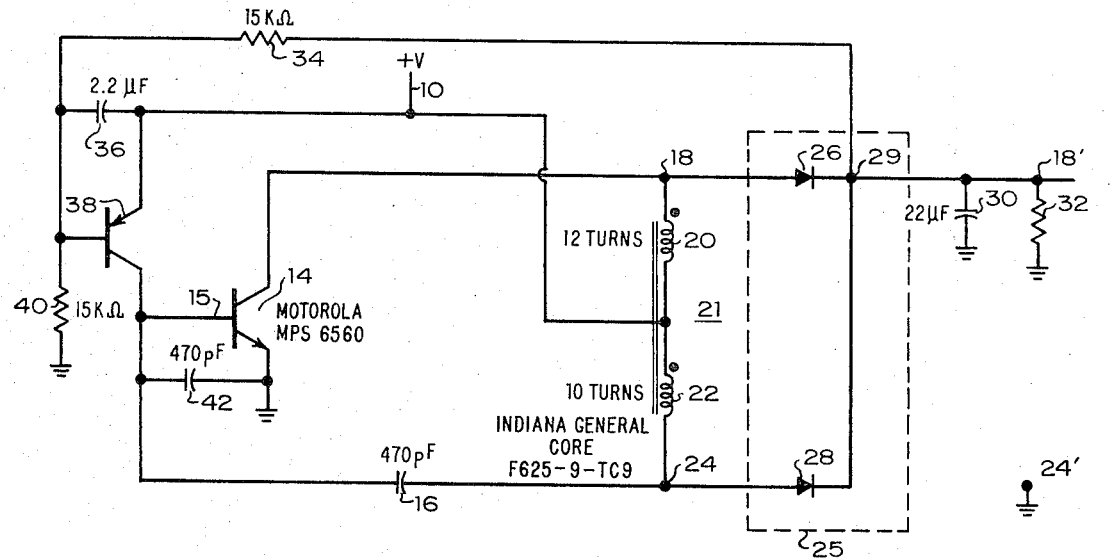
FIG. 2 is a simplified schematic representation of a regulated D.C. converter using the switch-type converter of FIG. 1.
Figure 3:
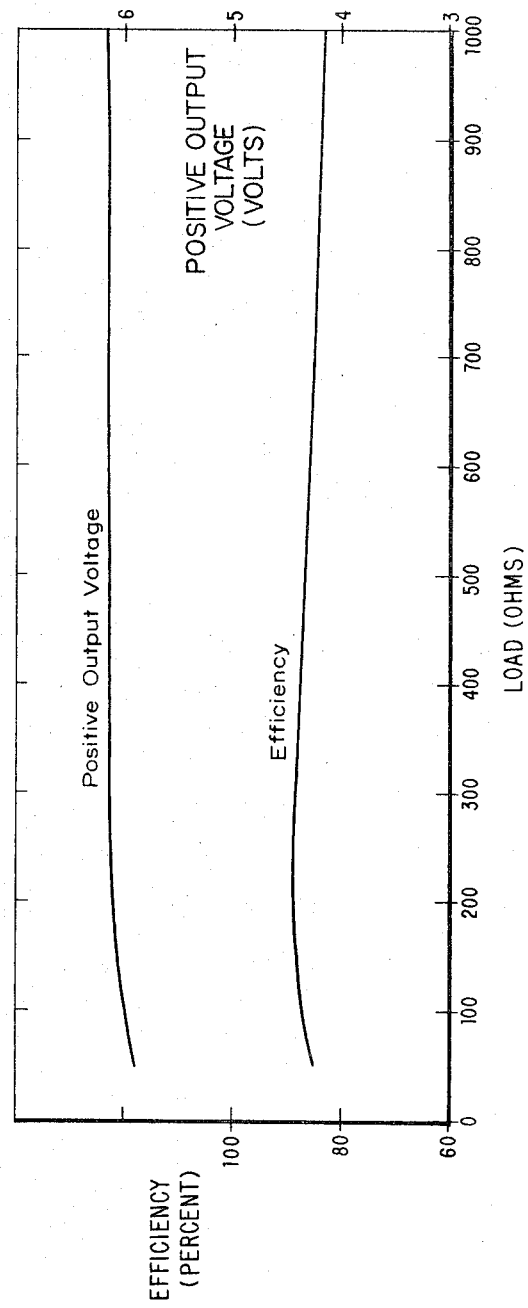
FIG. 3 is a plot of efficiency and output voltage versus load for the converter of FIG. 2.

As shown in FIG. 2, resistor 12 may be replaced by a transistor 38 to provide voltage regulation. Diodes 26 and 28, connected to terminals 18 and 24, respectively, comprise a full-wave rectifier having an output 29. Capacitor 30 and load 32, connected to output 29, provide filtering of the rectified signal. Resistors 34 and 40 form a voltage divider which is connected to output 29 and the base of transistor 38 to bias that transistor. The values of resistors 34 and 40 are so selected that transistor 38 provides the same bias current to base 15 as would resistor 12 under normal operating conditions. A decrease in load 32 will cause an increase in voltage on output 29, decreasing the base-emitter voltage and thus the conduction of transistor 38. This decrease in turn decreases the conduction of transistor 14 causing it to cut off sooner, decreasing the voltage at output 29. An increase in load 32 will cause a corresponding decrease in voltage on output 29, increasing the conduction of transistors 14 and 38 and increasing the voltage on output 29. Thus, resistors 34 and 40 and transistor 38 provide negative feedback to effect voltage regulation. The voltage regulation circuit also aids in starting up the switching action when the converter is first turned on. A capacitor 36 shorts the emitter of transistor 38 to its base during initial turn-on to assure initiation of the switching action. A capacitor 42 between base 15 and ground protects that transistor by limiting the pulse amplitude on base 15. FIG. 3 shows a graph of efficiency and output voltage versus load condition for the circuit of FIG. 2 where the voltage source 10 is 3.75 volts.

I claim:

1. A converter comprising:
   a transistor having an emitter, a base, and a collector and having a characteristic charge storage time;
   phase-inverting means connected to the collector for inverting a signal on the collector;
   a D.C. terminal connected to the phase-inverting means for receiving D.C. power;
   bias means connected between the base and the D.C. terminal for supplying bias current to the transistor; and
   capacitive means connected between the base and the phase-inverting means for transmitting the inverted signal from the phase-inverting means to the base, the impedance values of the capacitive means and bias means determining a time constant which is shorter than the characteristic charge storage time.

2. A converter as in claim 1 wherein:
   the bias means comprises a resistor; and
   the phase-inverting means comprises a transformer having a winding with a first and second terminus and a tap, the first terminus being connected to the collector, the second terminus being connected to the capacitive means, and the tap being connected to the D.C. terminal.

3. A converter as in claim 1 including a pulse-generating circuit connected to the base for supplying, at spaced intervals, pulses having a duration shorter than the characteristic storage time.

4. A converter as in claim 2 including:
   rectifying means connected to the first and second terminus for rectifying signals thereon; and
   filtering means connected to the rectifying means for filtering the rectified signals, wherein the bias means is also connected to the filtering means for changing the bias supplied to the base in response to the voltage level of the filtered signals.

5. A converter as in claim 1 wherein the phase inverting means is nonsaturating.

* * * * *